US006195476B1

(12) United States Patent
Schmid (10) Patent No.: US 6,195,476 B1
(45) Date of Patent: Feb. 27, 2001

(54) ACOUSTO-OPTIC DEVICES HAVING AN ACOUSTIC ATTENUATOR STRUCTURE

(75) Inventor: Steffen Schmid, Waghaeusel-Kirrlach (DE)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/493,036

(22) Filed: Jan. 28, 2000

Related U.S. Application Data

(63) Continuation of application No. PCT/EP98/04109, filed on Jul. 3, 1998, which is a continuation of application No. 60/054,818, filed on Aug. 5, 1997.

(30) Foreign Application Priority Data

Jul. 31, 1997 (EP) .................................................. 97113188

(51) Int. Cl.[7] ...................................................... G02B 6/10
(52) U.S. Cl. .................................. 385/7; 385/14; 385/16; 385/20; 385/21
(58) Field of Search .................................. 385/7, 8, 9, 10, 385/11, 14, 16, 20, 21

(56) References Cited

U.S. PATENT DOCUMENTS 5,002,349   3/1991  Cheung et al. .
5,542,009 * 7/1996  Kuehnle ................................... 385/7
5,796,882 * 8/1998  Schmid ................................... 385/11

FOREIGN PATENT DOCUMENTS 0 737 880   10/1996 (EP) .
2 304 917   3/1997 (GB) .

OTHER PUBLICATIONS

R.S. Chakravarthy et al., "Passband Engineering of Acousto–Optic Tunable Filters", Proceedings European Conference on Integrated Optics with Technical Exhibit, pp. 137–140, (1995).

D.A. Smith et al., "Acousto–Optic Switch with a Near Rectangular Passband for WDM Systems", Electronic Letters, vol. 32, No. 6, pp. 542–543, (1996).

"Probimide 400 Series", OCG Photoresist and Polyimide, Ciba–Geigy (1994).

"Probimide 7000 Series", OCG Polyimides, Ciba–Geigy (1994).

"Polyimide HTR3 Photosensitive Polyimide Precursors", OCG Microelectronics Materials NV (1995).

* cited by examiner

Primary Examiner—Hung Ngo
(74) Attorney, Agent, or Firm—Finnegan, Henderson, Farabow, Garrett & Dunner, L.L.P.

(57) ABSTRACT

Disclosed is an acousto-optic device having a number of acoustic attenuating structures and a method to limit the parasitic effects of a surface acoustic wave. The structures include any combination of the following: surrounding the acousto-optic conversion region with acoustic absorber, placing acoustic absorber near to the transducer(s), placing a strip of acoustic absorber between optical waveguides formed in the device, shaping one or more ends of acoustic waveguides formed in the device to absorb energy from the transducer(s), and/or extending the acoustic waveguides to further limit irradiation of unguided acoustic waves.

24 Claims, 6 Drawing Sheets

ACOUSTO-OPTIC DEVICES HAVING AN ACOUSTIC ATTENUATOR STRUCTURE

CROSS-REFERENCE TO RELATED APPLICATION

This application claims priority to U.S. Provisional patent application Serial No. 60/054,818, filed Aug. 5, 1997, the contents of which are relied upon and hereby incorporated herein by reference.

This application is a continuation of International Application No. PCT/EP98/04109, filed Jul. 3, 1998, the content of which is incorporated herein by reference.

BACKGROUND OF THE INVENTION

The present invention relates generally to acousto-optic devices, and more particularly to absorbing surface acoustic waves in acousto-optic devices.

Figure 1:
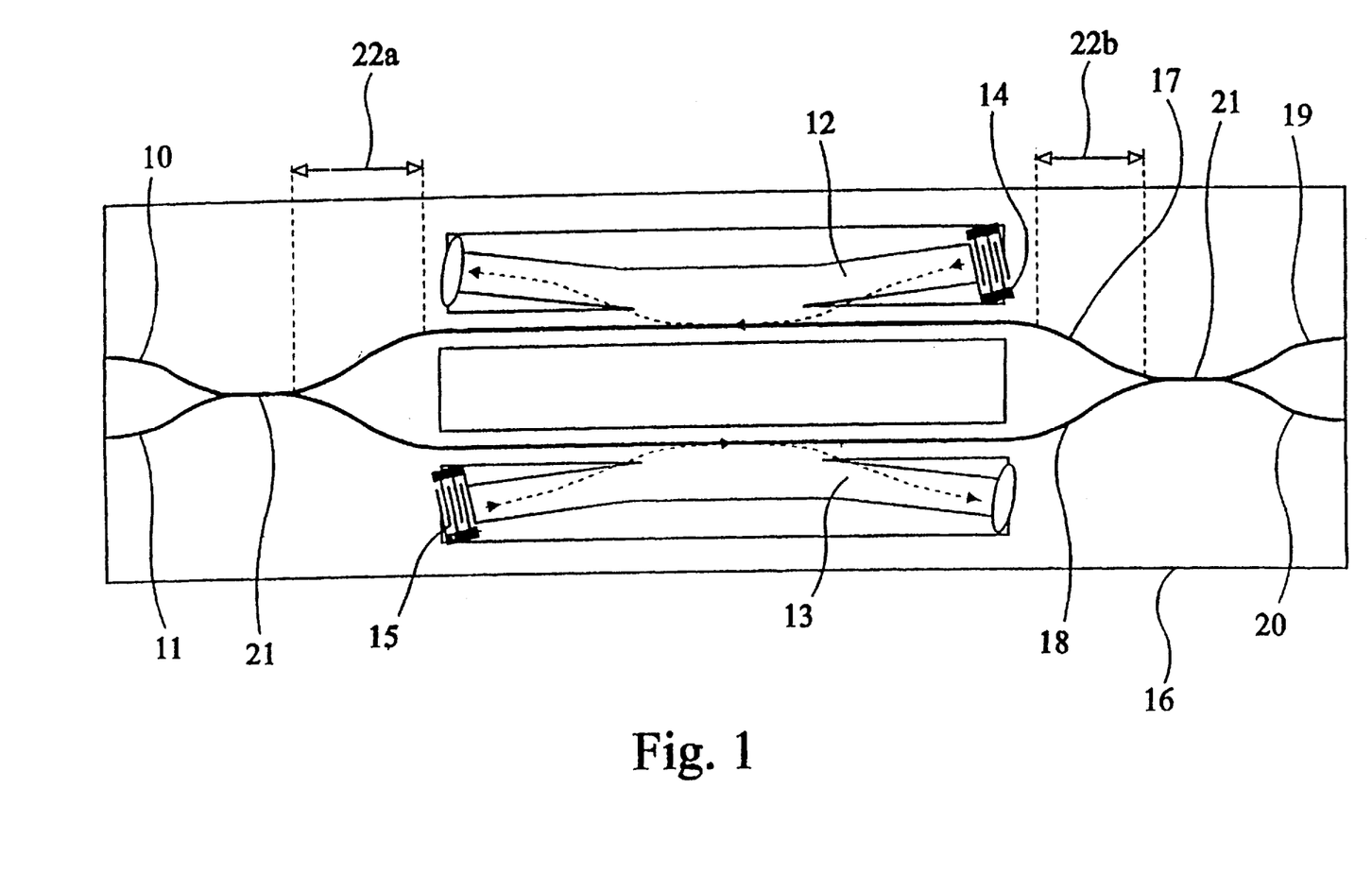
FIG. 1 is a drawing of a typical 2×2 acousto-optic switch.

Integrated acousto-optic devices function through the interaction of surface acoustic waves (SAWs) on a crystal surface with light traversing the crystal. An example of an acousto-optic device is shown in FIG. 1. The device is a 2×2 tunable optic switch having optical waveguides 10, 11, 17, 18, 19, and 20, with two bending sections 22a and 22b along a region of optical waveguides 17 and 18. The device also has acoustic waveguides 12 and 13, piezoelectric transducers 14 and 15, and polarization splitters 21. The device is formed on the surface of a crystal 16, such as $LiNbO_3$. When electrically stimulated, transducers 14 and 15 produce SAWs that travel through acoustic waveguides 12 and 13 and interact with light passing through optical waveguides 17 and 18.

The inventor has recognized, however, that non-ideal behavior of the SAW gives rise to parasitic effects. First, the SAW may be scattered due to inhomogeneities on the surface of the crystal. Inhomogeneities can be caused, for example, by indiffusion of dopants, surface impurities, additional surface layers, or by the borders of the substrate. The scattered SAW disturbs the acousto-optic interaction between the SAW and the light traveling through the waveguides.

The SAW can be scattered, or it can be reflected by the inhomogeneities, or by the acoustic waveguides. Scattered or reflected acoustic waves can interfere with other acoustic waves. The resulting interference pattern changes with the wavelength of the SAW resulting in wavelength dependent characteristics of the acousto-optic device.

Further, the structure that generates the SAW (e.g., piezoelectric transducers 14 and 15 of FIG. 1) does not necessarily generate directed waves. Rather, the waves irradiate in various directions, degrading device performance.

Other problems associated with conventional acousto-optic devices include internal reflections of the transducer that result in fluctuations of transducer efficiency with frequency. Also, waves propagating inside the substrate ("bulk-waves") can interfere with those propagating on the surface.

Finally, In acousto-optic devices like the one shown in FIG. 1, a coupling between acoustic waveguides 12 and 13 may develop. If such coupling develops, the efficiency of both converters Is decreased. To function effectively, then, the waveguides 12 and 13 must be separated by a relatively large distance (typically 200 microns). This required separation limits the degree to which the devices can be integrated.

U.S. Pat. No. 6,002,349 discusses the integration of acousto-optic filters and switches. The objects of the invention are to provide an efficient acousto-optic structure on an x-cut piezoelectric substrate and to provide an acousto-optic filter and coupler that do not incur an optical frequency shift and that are polarization independent To achieve these objects, the invention includes a two-stage acousto-optic filter fabricated as an integrated circuit with an acoustic absorber between the two stages.

European Patent Application EP 0737880A1 discusses an acousto-optical waveguide device for wavelength selection. As shown in FIG. 4. the device includes an acoustic absorbing means placed along an acoustic waveguide 41, close to the end of optical waveguide 36 that is connected to coupler 37 to absorb the residual acoustic wave. It also includes an acoustic absorbing means placed close to the end of waveguide 34 that is connected to coupler 32 to absorb the acoustic wave generated by transducer 44 propagating in a direction opposite to the optical signals.

UK Patent Application (Publication No. GB 2,304,917) entitled "Integrated Optical Devices" discloses a tunable filter having an acoustic waveguide parallel to an optical waveguide. The application discloses two methods of controlling the power density of an advancing acoustic wave and, thus, the power transfer to the optical wave. First, the acoustic waveguide can have a varying cross-sectional area. Second, the energy of the acoustic wave can be absorbed along the length of the acoustic waveguide.

Finally, a publication entitled "Passband Engineering of Acousto-Optic Tunable Filters" by R. S. Chakravarthy et al. (1995 ECIO Proceedings, paper TuPo, Poster Session, p. 137–40) investigates solutions to the problems of interchannel crosstalk and wavelength misalignment crosstalk in acousto-optic tunable filters. The authors propose, among other things, placing an attenuating overlay symmetrically along the length of the device taking care to avoid the optical waveguides. The device structure is shown in FIGS. 4(a) and 5(a).

The inventor has discovered that these techniques do not solve the problems recognized by the inventor. The inventor has found a need, therefore, for an acousto-optic device that reduces the parasitic effects of surface acoustic waves.

SUMMARY OF THE INVENTION

We have found that an acoustic absorber placed at predetermined locations around the acoustic waveguides and the optical waveguides acts to reduce or eliminate the problem created by the above-described parasitic effects. An acousto-optic device according to one aspect of the present invention includes a substrate of a material capable of propagating a surface acoustic wave along a portion of the surface of the substrate, a transducer for generating the surface acoustic wave, an optical waveguide formed in the substrate, and an acoustic absorber surrounding said portion of the substrate.

An acousto-optic switch according to another aspect of the present invention includes a substrate of a material capable of propagating a surface acoustic wave along a surface of the substrate, first and second optical waveguides formed in the substrate, first and second acoustic waveguides contacting the first and second optical waveguides, respectively, each having a first end and a second end, first and second transducers for generating a surface acoustic wave in the first and second acoustic waveguides, respectively, and an acoustic absorber surrounding the first and second acoustic waveguides.

Another acousto-optic device according to yet another aspect of the present invention includes a substrate of a material capable of propagating a surface acoustic wave along a surface of the substrate, at least one optical waveguide formed in the substrate, at least one acoustic waveguide formed in the substrate, at least one transducer for generating a surface acoustic wave, and an acoustic absorber surrounding the at least one acoustic waveguide.

Another acousto-optic switch according to another aspect of the present invention includes a substrate of a material capable of propagating a surface acoustic wave along a surface of the substrate, first and second optical waveguides formed in the substrate, first and second acoustic waveguides contacting the first and second optical waveguides, respectively, each having a first end and a second end, first and second transducers for generating a surface acoustic wave in the first and second acoustic waveguides, respectively, and an acoustic absorber disposed between the first and second acoustic waveguides.

A method consistent with the present invention includes the steps of providing a substrate having an optical waveguide and an acoustic waveguide formed therein, wherein the optical waveguide and the acoustic waveguide font an acousto-optic interaction region, and absorbing scattered acoustic waves in a region surrounding the acousto-optic interaction region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

DETAILED DESCRIPTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Figure 2:
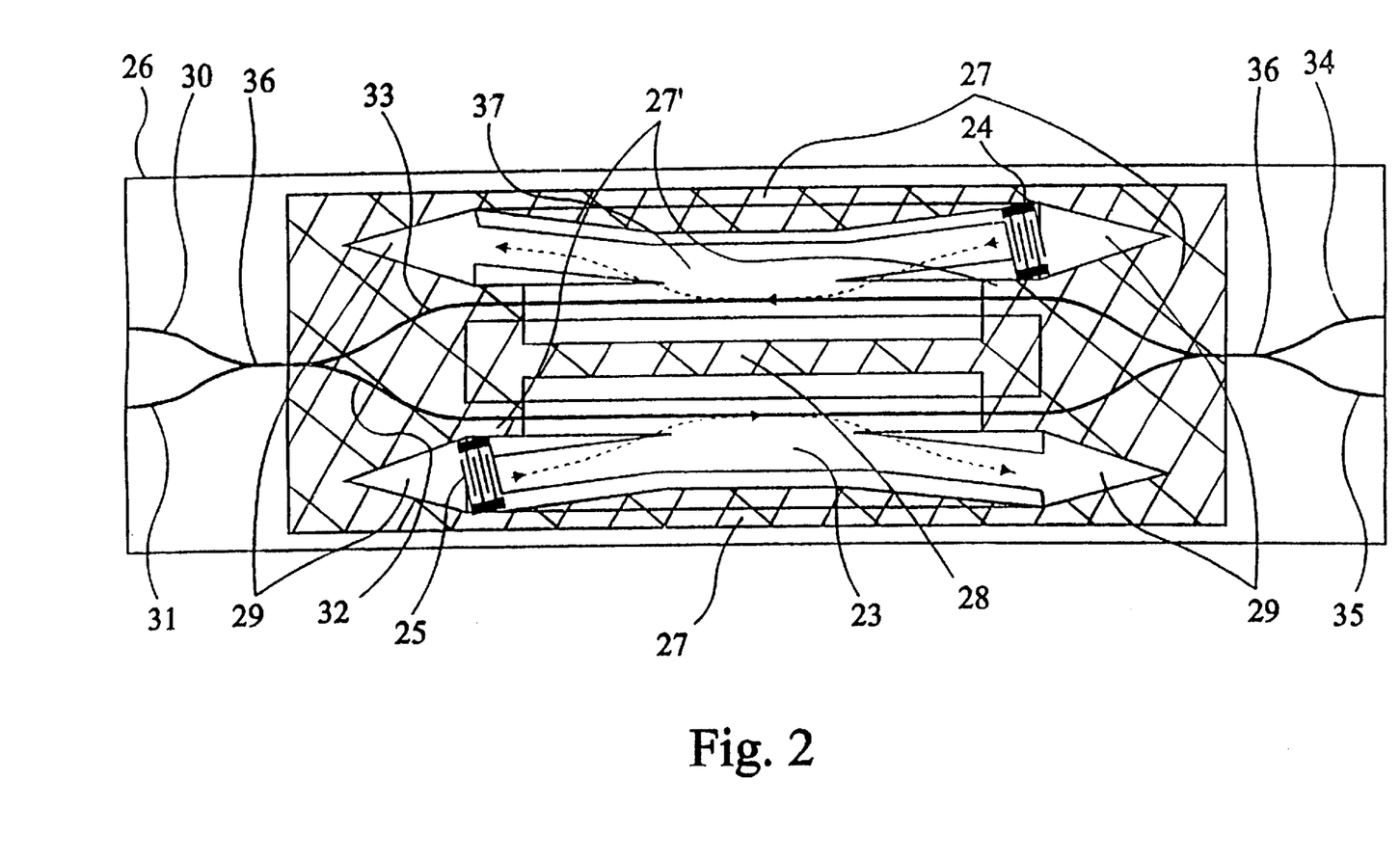
FIG. 2 is a drawing of a 2×2 acousto-optic switch consistent with the present invention.

An acousto-optic device consistent with the present invention is shown in FIG. 2. In this embodiment, the device is a 2×2 tunable optic switch having optical waveguides 30, 31, 32, 33, 34 and 35, polarization splitters 36, acoustic waveguides 23 and 37, and piezoelectric transducers 24 and 25. The device is formed on the surface of a crystal 26, such as $LiNbO_3$. The device is modified in the following ways to minimize the parasitic effects of the SAWs generated by transducers 24 and 25.

First, the entire acousto-optic conversion region is surrounded by an acoustic absorber 27, thus suppressing the effects caused by scattering and/or reflection of irradiated waves.

In a different embodiment, not shown, each acousto-optic conversion region is surrounded by a separate acoustic absorber.

Second, acoustic absorber 27' is placed near transducers 24 and 25 to absorb radiated waves emitted from the transducers but not coupled to the waveguides.

Also, a stripe 28 of acoustic absorber is placed between acoustic waveguides 23 and 37. Preferably, stripe 28 is approximately 50 microns wide. It serves to reduce the acoustical crosstalk between the convertors, enhancing the conversion efficiency. This enhanced isolation between the convertors can be used to reduce the gap between them, thus decreasing the overall device size, allowing for a higher degree of integration, and improving the device characteristics.

The acoustic absorber is also used close to the end of acoustic waveguides 23 and 37 to include a V-shaped structure 29 behind transducers 24 and 25. The structure 28 absorbs acoustic waves generated in that direction. The structure 29, used in conjunction with the acoustic absorber placement described above, has a number of advantages. First, there is a more distributed absorption of the SAW, resulting in less local heating. Second, since structure 29 absorbs some of the acoustic waves, the acoustic absorber is mechanically less stressed by the acoustic wave. Preferably, the ends of acoustic waveguides 23 and 37 opposite transducers 24 and 25 are also surrounded by a V-shaped absorbing structure, resulting in similar advantages to those discussed above. Although a V-shaped structure 29 is shown, any geometry suitable to a desired distribution of absorbed energy and heat may be used.

Figure 3:
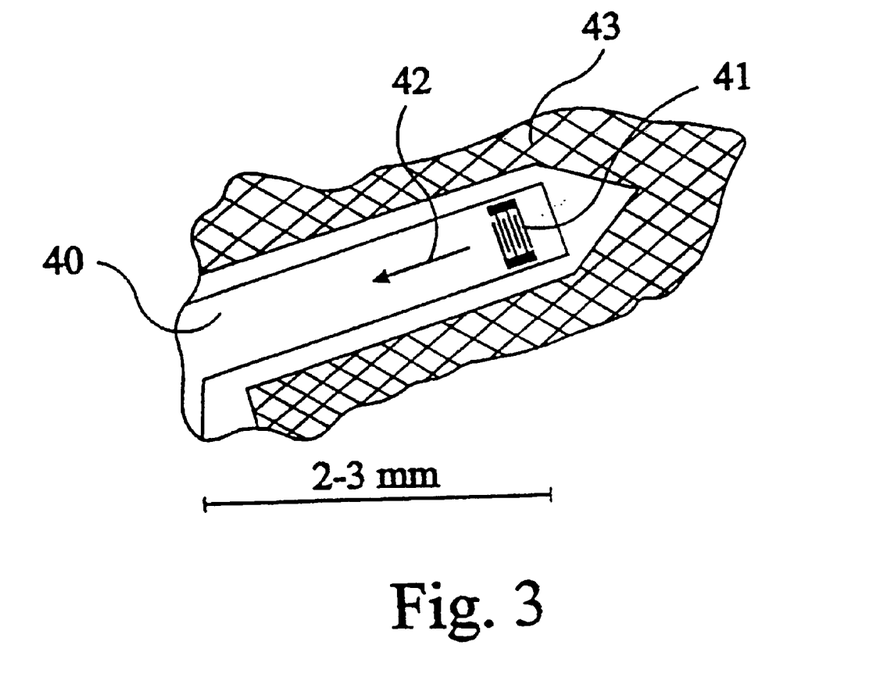
FIG. 3 is a drawing of a region surrounding the transducer of FIG. 2 according to one embodiment of the invention.
Figure 4:
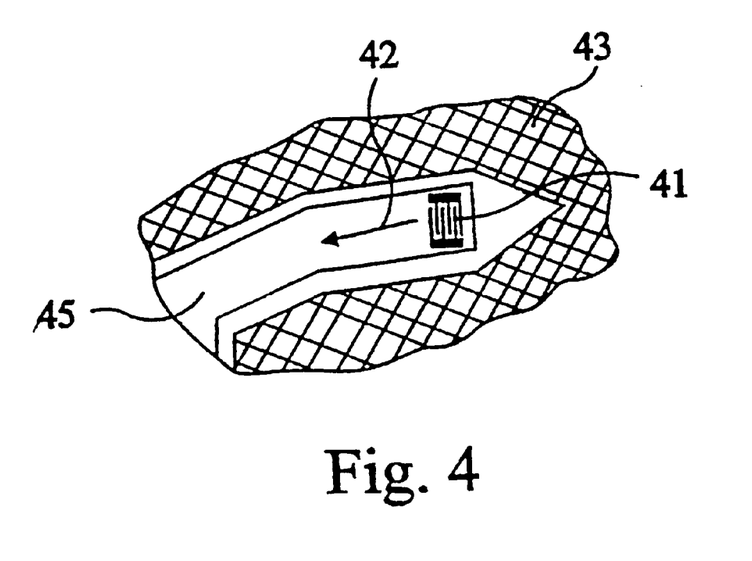
FIG. 4 is a drawing of a region surrounding the transducer of FIG. 2 according to another embodiment of the invention.

The inventor has further recognized that the irradiation of acoustic waves along directions other than the direction of the acoustic waveguide (i.e., unguided acoustic waves) takes place not only from the transducer itself, but also from a portion further down the acoustic waveguide where the SAW is stronger. FIGS. 3 and 4 show two structures that limit irradiation from this portion by increasing the length of the acoustic waveguide. FIG. 3 shows an acoustic waveguide 40 having a transducer 41 forming a SAW 42 along acoustic waveguide 40. Acoustic waveguide 40 is surrounded by an acoustic absorber 43. To limit irradiation of acoustic energy from a portion down acoustic waveguide 40 from transducer 41, acoustic waveguide 40 is extended by 2–3 mm.

The extension of acoustic waveguide 40, however, has the effect of increasing the overall device size. Therefore, in the embodiment shown in FIG. 4, acoustic waveguide 45 is extended, but also bent toward the center of the device. Although a small acoustic loss of about 0.5 dB can be expected due to the bend, the size of the device is not changed. As with the structure shown in FIG. 3, the structure of FIG. 4 also has the effect of limiting the irradiation of unguided acoustic waves emanating from the SAW 42 at a portion down acoustic waveguide 45 from transducer 41, To maximize the effectiveness of the acoustic absorber used in the acousto-optic device, the material used for the acoustic absorber should possess certain characteristics. It should have, for example, a high acoustic attenuation coefficient to allow for efficient isolation of neighboring structures, and small reflectivity to avoid interference effects. It should also be easy to fabricate, resist heat, and maintain its characteristics over the life of the device. Polyimides, one of a large family of polymers, satisfy these requisites due to their basic chemical structure. Polyimides are commercially available from Ciba-Geigy, such as in the Probimide 400 and 7000 series.

Further, additives can be added to polyimides making them photosensitive. Thus, the polyimides act as a photoresist and can be deposited on the acousto-optic device by simple means of microlithography. Specifically, we have found that Probimide 408 and 7020 possess particularly advantageous properties for use as acoustic absorbers. When deposited in the pattern described above at a thickness of 20 microns, polyimides exhibit an attenuation coefficient of approximately 23 dB/mm at a frequency of approximately 170 MHz. This measurement was taken with the absorber oriented at a right angle to the acoustic waves.

Referring to FIG. 2, using a 50 micron wide stripe 28 along the separating gap reduces the acoustic crosstalk between the convertors from −15 dB to less than −25 dB, resulting in increased conversion efficiency. This measurement was taken with the absorber oriented parallel to the acoustic wave. The enhanced isolation can also be used to shorten the gap between the convertors. Experiments show that the gap 10 can be reduced by at least 25 percent (from 170 microns to 130 microns). Also, the length of the bending section can be shortened by approximately 20 percent (from 8 mm to 6.5 mm). The benefits of this shortened length are multiplied when double stage devices are used. As discussed above, the shortened gap and bending section length lead to increased integration of the acousto-optic devices.

Figure 5A:
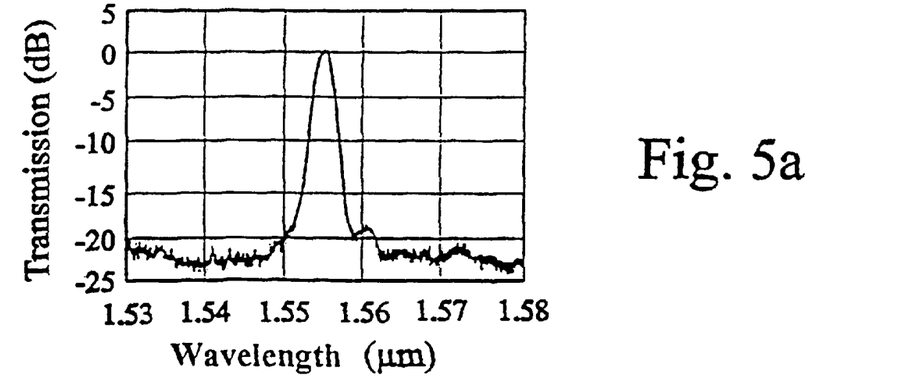
FIG. 5a is a drawing of the filter characteristic of a typical 2×2 acousto-optic switch without acoustic absorbers.
Figure 5B:
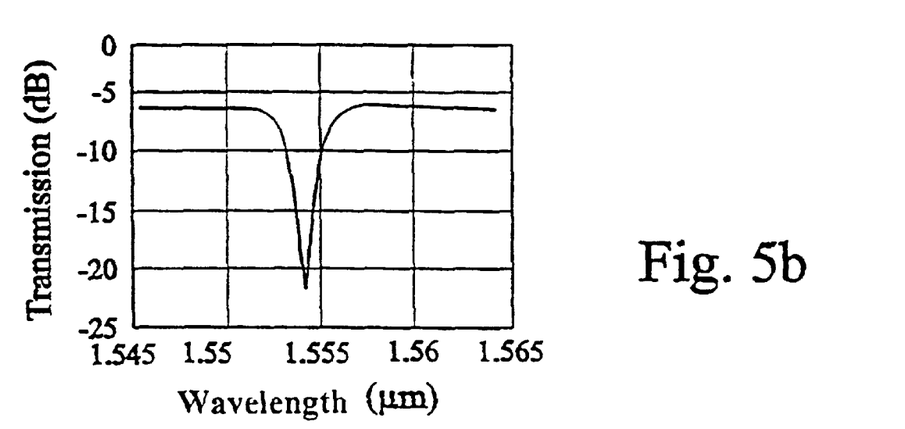
FIG. 5b is a drawing of the notch characteristic of a typical 2×2 acousto-optic switch without acoustic absorbers.
Figure 6:
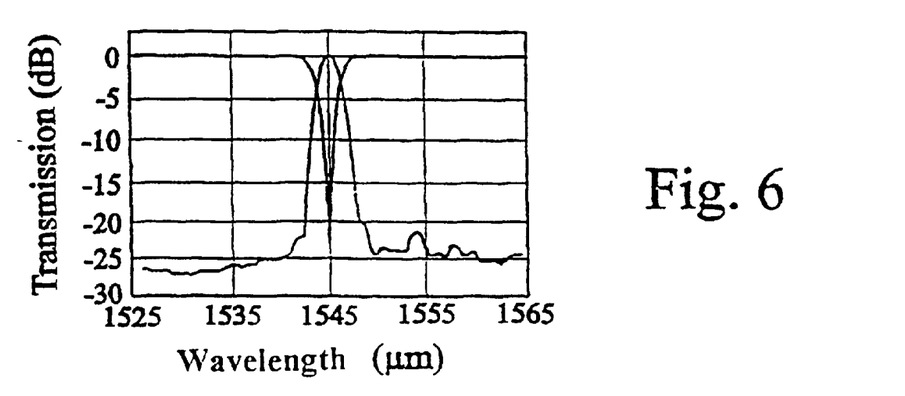
FIG. 6 is a drawing of the filter and notch characteristics of a 2×2 acousto-optic switch consistent with the present invention.

FIG. 5a shows the filter characteristic of a 2×2 acousto-optic switch without acoustic absorbers. The filter has a peak of approximately 22 dB above the noise floor. FIG. 5b shows the notch characteristic for the 2×2 switch without acoustic absorbers. The notch extinction is approximately 17 dB. FIG. 6, on the other hand, shows the filter and notch characteristics for a 2×2 switch with acoustic absorbers. The filter characteristic has a peak of approximately 25 dB above the noise floor, while the notch extinction has improved to approximately 22 dB. The side lobes have been reduced from −18 dB to approximately −22 dB, and the crosstalk has been reduced to below −25 dB.

Figure 7:
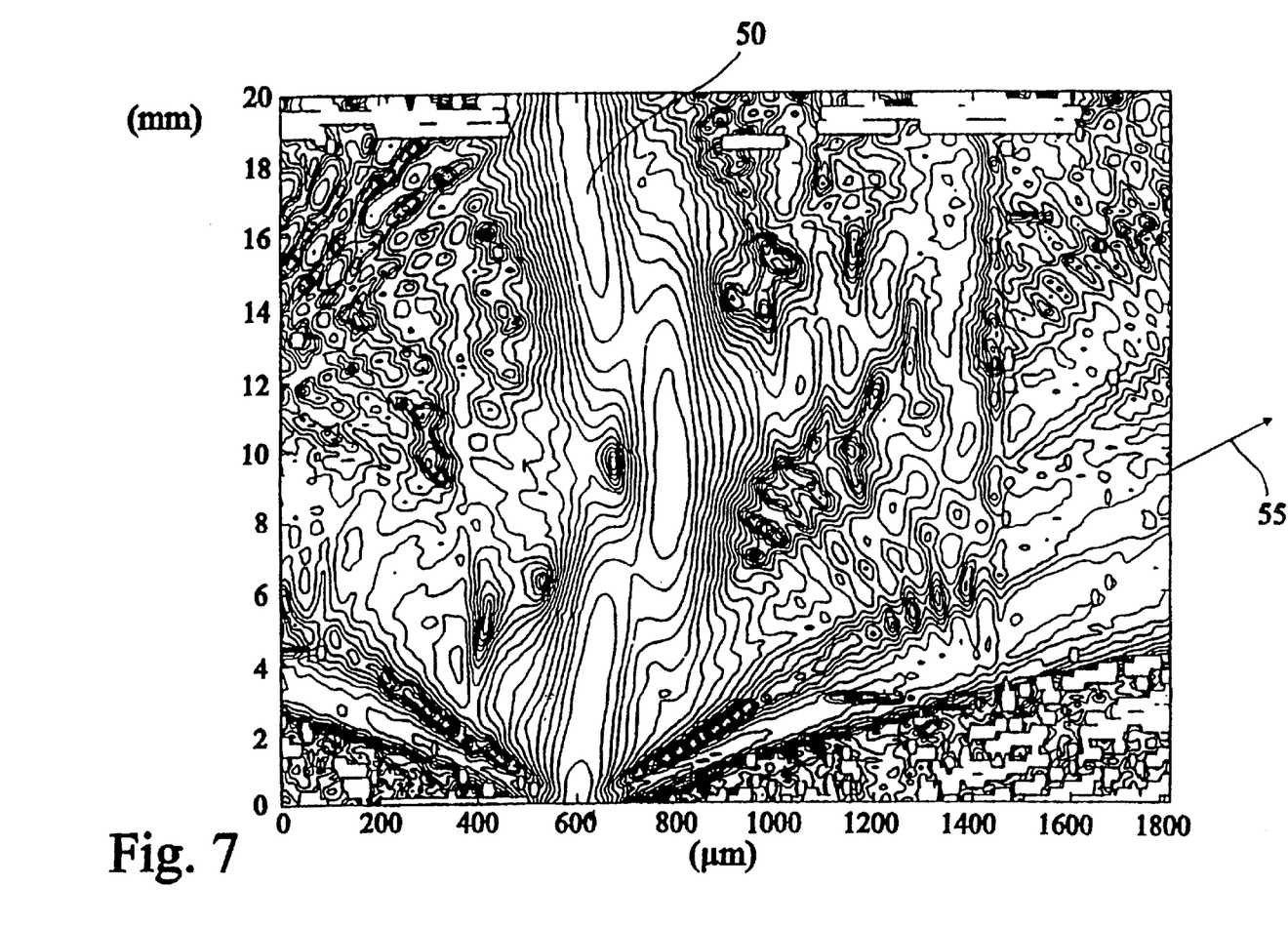
FIG. 7 is a drawing of acoustic power distribution in an acousto optic device without acoustic absorbers.
Figure 8:
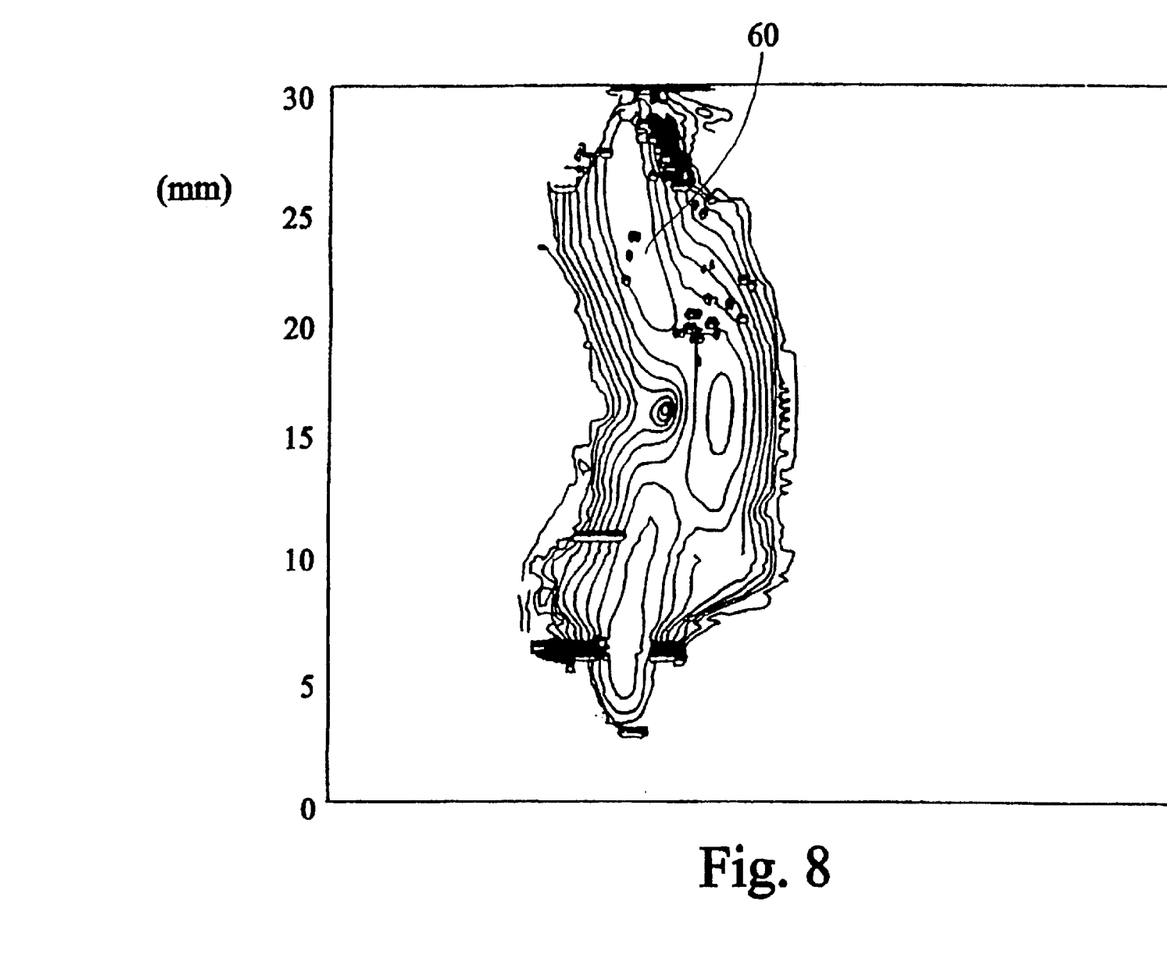
FIG. 8 is a drawing of acoustic power distribution in an acousto optic device with acoustic absorbers.

FIG. 7 shows the acoustic propagation in an acousto optic device without the acoustic absorbers. The propagation is not confined to the acoustic waveguide 50, but rather irradiates throughout the device. These irradiated and unguided waves, such as those along line 55, propagate across the optical waveguide and interfere with acousto optic conversion. FIG. 8, in contrast, shows the same device using the teaching of the present invention. Unlike in FIG. 7, the acoustic propagation is largely confined to the acoustic waveguide 60, enhancing the overall efficiency of the device.

While there has been illustrated and described what are at present considered to be preferred embodiments of the present invention, it will be understood by those skilled in the art that various changes and modifications may be made, and equivalents may be substituted for elements thereof without departing from the true scope of the invention. For example, other materials, such as silicon, may possibly be used as the acoustic absorber in the place of polyimides.

In addition, many modifications may be made to adapt a particular element, technique or implementation to the teachings of the present invention without departing from the central scope of the invention. Therefore, it is intended that this invention not be limited to the particular embodiments disclosed herein, but that the invention includes all embodiments falling within the scope of the apponded claims and their equivalents.

I claim:

1. An acousto-optic device comprising:
   a substrate of a material capable of propagating a surface acoustic wave along a surface of the substrate;
   a first acoustic waveguide formed in the substrate;
   a first optical waveguide formed in the substrate and contacting the acoustic waveguide;
   a first transducer for generating a surface acoustic wave in the first acoustic waveguide; and
   an acoustic absorber surrounding the first acoustic waveguide.

2. The acousto-optic switch of claim 1 wherein the substrate material is $LiNbO_3$.

3. The acousto-optic device of claim 1 wherein the acoustic absorber contains polyimides.

4. The acousto-optic device of claim 1 further including an acoustic absorber placed near the first transducer.

5. The acousto-optic device of claim 1 having an end acoustic absorber placed near an end of the first acoustic waveguide, said end absorber being of a shape to absorb acoustic energy.

6. The acousto-optic device of claim 5 wherein the end absorber has a V-shape.

7. The acousto-optic device of claim 1 wherein there are two optical waveguides.

8. The acousto-optic device of claim 7 further including a strip of acoustic-absorber disposed between the two optical waveguides.

9. The acousto-optic device of claim 8 wherein the strip of acoustic absorber is at least 50 microns wide.

10. The acousto-optic device of claim 1 wherein an end of the at least one acoustic waveguide containing the transducer is extended by at least 2 mm.

11. The acousto-optic device of claim 10 wherein the at least one extended acoustic waveguide is bent.

12. The acousto-optic device of claim 1 further including:
    a second optical waveguide formed in the substrate;
    a second acoustic waveguide contacting the first second optical waveguide, respectively, each having a first end and a second end;
    a second transducer for generating a surface acoustic wave in the second acoustic waveguide, and wherein the acoustic absorber surrounds the first and second acoustic waveguides.

13. The acousto-optic device of claim 12 further including:
    a strip of acoustic absorber disposed between the first and second acoustic waveguides.

14. The acousto-optic device of claim 13 wherein the strip of acoustic absorber is at least 50 microns wide.

15. An acousto-optic switch comprising:

a substrate of a material capable of propagating a surface acoustic wave along a surface of the substrate;

first and second optical waveguides formed in the substrate;

first and second acoustic waveguides contacting the first and second optical waveguides, respectively, each having a first end and a second end;

first and second transducers for generating a surface acoustic wave in the first and second acoustic waveguides, respectively; and an acoustic absorber disposed between the first and second acoustic waveguides.

16. The acoustic-optic switch of claim 15 wherein the substrate material is $LiNbO_3$.

17. The acoustic-optic switch of claim 15 wherein the acoustic absorber contains polyimides.

18. The acousto-optic switch of claim 15 further including an acoustic absorber surrounding the first and second optical waveguides and the first and second acoustic waveguides.

19. The acoustic-optic switch of claim 15 wherein the acoustic absorber is at least 50 microns wide.

20. The acousto-optic switch of claim 15 having an end acoustic absorber placed near the at least one end of the first an/or second acoustic waveguides, said end absorber being of a shape to absorb acoustic energy.

21. The acousto-optic switch of claim 20 wherein the end acoustic absorber has a V-shape.

22. The acousto-optic device of claim 15 wherein the ends of the first and second acoustic waveguides containing the transducers are extended by at least 2 mm.

23. The acousto-optic device of claim 22 wherein the extended acoustic waveguides are bent.

24. A method for limiting parasitic effects in an acoustic-optic device having a substrate with an optical waveguide and an acoustic waveguide formed therein, wherein the optical waveguide and the acoustic waveguide form an acousto-optic interaction region, comprising the step of absorbing scattered acoustic waves in a region surrounding the acoustic-optic interaction region.

* * * * *